United States Patent
Ryu et al.

(10) Patent No.: US 9,715,347 B2
(45) Date of Patent: Jul. 25, 2017

(54) VIRTUAL DISK MIGRATION

(71) Applicant: NETAPP, INC., Sunnyvale, CA (US)

(72) Inventors: Sungwook Ryu, Sunnyvale, CA (US);
Joshua Flank, Sunnyvale, CA (US);
Pradeep Thirunavukkarasu,
Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 50 days.

(21) Appl. No.: 14/712,845

(22) Filed: May 14, 2015

(65) Prior Publication Data
US 2016/0335007 A1    Nov. 17, 2016

(51) Int. Cl.
*G06F 3/06* (2006.01)
*G06F 9/50* (2006.01)
*G06F 9/455* (2006.01)

(52) U.S. Cl.
CPC ............ *G06F 3/0619* (2013.01); *G06F 3/065* (2013.01); *G06F 3/0665* (2013.01); *G06F 3/0689* (2013.01); *G06F 9/45558* (2013.01); *G06F 9/5016* (2013.01); *G06F 2009/4557* (2013.01); *G06F 2009/45579* (2013.01); *G06F 2009/45583* (2013.01)

(58) Field of Classification Search
CPC ............................................ G06F 2009/45562
See application file for complete search history.

(56) References Cited

U.S. PATENT DOCUMENTS

| | | | |
|---|---|---|---|
| 5,710,917 A | 1/1998 | Musa et al. | |
| 8,386,838 B1 | 2/2013 | Byan | |
| 9,146,769 B1* | 9/2015 | Shankar | G06F 9/45558 |
| 2008/0235238 A1 | 9/2008 | Jalobeanu et al. | |
| 2010/0070725 A1* | 3/2010 | Prahlad | G06F 11/1453 711/162 |
| 2011/0131524 A1 | 6/2011 | Chang et al. | |
| 2013/0024722 A1 | 1/2013 | Kotagiri et al. | |
| 2013/0139155 A1 | 5/2013 | Shah | |
| 2013/0343385 A1 | 12/2013 | Benny et al. | |
| 2014/0149983 A1* | 5/2014 | Bonilla | G06F 9/45558 718/1 |
| 2015/0134615 A1* | 5/2015 | Goodman | G06F 3/0617 707/639 |

(Continued)

OTHER PUBLICATIONS

John, Jeevan, "Top Three Things to Know Before you Migrate to Clustered Data ONTAP", Jul. 23, 2013.*

*Primary Examiner* — Edward Dudek, Jr.
(74) *Attorney, Agent, or Firm* — Gilliam IP PLLC

(57) ABSTRACT

Techniques for managing the migration of data from one virtual machine to another using volume snapshotting and sub-file cloning are described. According to exemplary embodiments, data including a header and content is stored on a storage volume associated with a first virtual machine. The header is converted to be compatible with a second virtual machine, and the storage volume is snapshotted to provide a read-only representation of the storage volume at the time that the snapshot was created. New data is created using the converted header and a pointer to the location of the data inside the volume snapshot. Using the exemplary techniques described herein, data can be migrated from one virtual machine to another in constant time, and data access is more robust because the pointer refers to the volume snapshot.

17 Claims, 7 Drawing Sheets

(56) References Cited

U.S. PATENT DOCUMENTS

2015/0140974 A1     5/2015  Liimatainen
2015/0324216 A1*   11/2015  Sizemore ............ G06F 9/45558
                                                                718/1
2015/0324217 A1*   11/2015  Shilmover .......... G06F 9/45558
                                                                718/1

* cited by examiner

VIRTUAL DISK MIGRATION

BACKGROUND

A virtual machine (VM) is a software implementation of a machine, such as a computer, that executes programs like a physical machine. A VM allows multiple operating systems to co-exist on a same hardware platform in strong isolation from each other, utilize different instruction set architectures, and facilitate high-availability and disaster recovery operations. Migrating data between VM architectures, however, may be problematic. For instance, migration may cause a disruption in services, lengthy migration times, or in some cases lead to data corruption.

SUMMARY

Exemplary embodiments described herein provide methods and systems for faster, more stable and more reliable migrations of virtual machines. Conventionally, migrating data (e.g., virtual disks) from one virtual machine to another involves making a new copy of the data at the destination virtual machine. As the virtual disk grows in size, migration takes longer and longer.

According to an embodiment, a virtual disk to be migrated includes a header and content. The virtual disk is stored on a storage volume associated with a first virtual machine. The header specifies meta-information about the virtual disk, some or all of which is specific to the type of the first virtual machine. The virtual disk also includes content representing the information stored in the virtual disk.

The header is typically small (on the order of a few kilobytes) and the content is typically large (on the order of a few megabytes to a few terabytes). According to exemplary embodiments, the header is converted to be compatible with a second virtual machine, and the storage volume is snapshotted to provide a read-only representation of the storage volume at the time that the snapshot was created. A new virtual disk is created using the converted header and a pointer to the location of the virtual disk inside the volume snapshot.

Using the exemplary techniques described herein, virtual disks can be migrated from one virtual machine to another in constant time. This is accomplished because, regardless of the size of the content, the use of sub-file data cloning (as opposed to a copy operation) allows content portion of the migrated data to be created instantaneously. Furthermore, data access is more robust because the pointer refers to the volume snapshot, and not to the original virtual disk or a snapshot of the original virtual disk. Because the original virtual disk (or a snapshot of the original virtual disk) could be moved to a new location in the volume, the use of a pointer to the original virtual disk or a snapshot of the original virtual disk could result in read errors when the data is accessed.

According to one embodiment, a computer-implemented method is provided for migrating data. The method includes receiving a request to migrate a virtual disk from a source virtual machine to a destination virtual machine, the virtual disk being stored on a volume accessible to the source virtual machine. In some embodiments, the volume is an ONTAP data volume.

The virtual disk is parsed into a header and content, and the header is reconfigured to be compatible with the destination virtual machine. A snapshot of the volume is accessed, and a pointer to sub-portions of the content within the snapshot of the volume is generated. The reconfigured header and the pointer to the content are stored as destination virtual machine data. According to exemplary embodiments, the virtual disk is migrated in constant time (i.e., the amount of time required to migrate the virtual disk does not increase with the size of the content). Because a pointer to the volume snapshot is used, the destination virtual machine data may be free of a copy of the content of the data.

The source virtual machine may be managed by a first type of hypervisor, and the destination virtual machine may be managed by a second type of hypervisor. The first type of hypervisor may be different than the second type of hypervisor. For example, the first type of hypervisor and the second type of hypervisor may store data using different virtual disk formats. In some embodiments, a snapshot of the hypervisor managing the source virtual machine may be created to assist in data migration.

The invention may also be embodied as instructions stored on a non-transitory computer-readable medium, and as a system including logic executable on a processor to carry out the above-described method.

DETAILED DESCRIPTION

Figure 1:
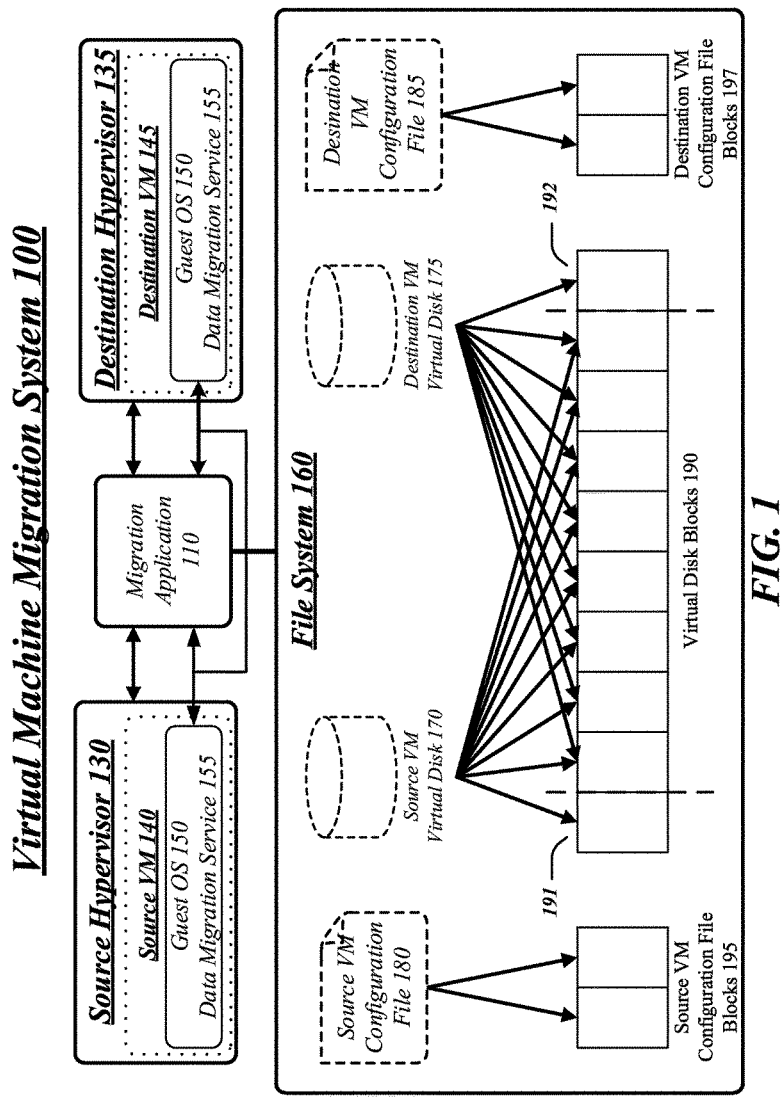
FIG. 1 illustrates an embodiment of a virtual machine migration system.

Various embodiments are generally directed to techniques for migrating data from a source virtual machine to a destination virtual machine.

According to exemplary embodiments, a guest operating system (OS) runs on top of an execution environment platform known as the virtual machine (VM), which abstracts a hardware platform from the perspective of the guest OS. The abstraction of the hardware platform, the providing of the virtual machine, is performed by a hypervisor, also known as a virtual machine monitor, which runs as a piece of software on a host OS. The host OS typically runs on an actual hardware platform, though multiple tiers of abstraction may be possible. While the actions of the guest OS are performed using the actual hardware platform, access to this platform is mediated by the hypervisor. For instance, virtual network interfaces may be presented to the guest OS that present the actual network interfaces of the base hardware platform through an intermediary software layer. The processes of the guest OS and its guest applications may execute their code directly on the processors of the base hardware platform, but under the management of the hypervisor.

Multiple vendors provide hypervisors for the execution of virtual machines using abstraction technology unique to the vendor's implementation. The vendors use technology selected according to their own development process. However these are frequently different from vendor to vendor. Consequently, the guest OS has tailored virtual hardware and drivers to support the vendor implementation. This variation may lead to a core incompatibility between VM platforms. For example, different VM platforms may use different technologies for bridging to a network, where virtualized network interfaces are presented to the guest OS. Similarly, different VM platforms may use different formats for arranging the data stored in virtual disks onto actual storage hardware. As such, migrating a guest OS from one VM platform to another may require reconfiguration of the guest OS and modification of files stored on the host OS that are referenced by the hypervisor. Performing this reconfiguration and modification may improve the affordability and practicality of transitioning a virtual machine between VM platforms.

According to exemplary embodiments, volume snapshotting is employed by a disk volume associated with the source virtual machine. For example, when a guest operating system (OS) operating on the source virtual machine issues a disk write request, the write request may be intercepted. Instead of overwriting the disk block that was the subject of the write request, the original disk block may be preserved, and a new disk block may be created containing the changes to the data indicated in the disk write request. Accordingly, the up-to-date version of the data (e.g., a file) may be obtained by referring to the original disk block and the changes recorded at the new disk block. Moreover, a subset of the original disk blocks and/or the changed disk blocks represents a "snapshot" of the volume as it existed at any given time. Because the disk blocks are not edited as new write operations occur, the snapshot is a read-only representation of the volume at that time.

In exemplary embodiments, volume snapshotting is employed in conjunction with a procedure for sub-file data cloning that scales extremely efficiently (in constant time, meaning that the time required to process the virtual disks data during migration does not scale up as the size of the virtual disks increases). When a request to migrate one or more virtual disks is received, the virtual disks are parsed into a header and content. The header includes meta-information that may be specific to the virtual machine with which the data is currently affiliated. The header is converted into a format compatible with a destination virtual machine, and placed into a new data object (e.g., a new virtual disk or file). The content of the new data object is replaced with a pointer to the location of the original data content inside the volume snapshot. Because the content is replaced with one or more pointers, and not copied, data migration occurs quickly and efficiently. And because the pointer refers to the read-only volume snapshot (instead of, for example, the original virtual disk on a volume that does not employ snapshotting, or even a snapshot of the individual virtual disk in the volume), the pointer will continue to refer to the correct memory address in the volume without the need to account for the possibility that the virtual disk could be moved (which would cause the migrated virtual disk to become corrupted and could lead to system crashes).

The sub-file cloning procedure also saves space at the destination virtual machine because only pointers to relevant disk blocks (as opposed to whole copies of the data) are stored. Because of the sub-file cloning procedure, a full VM migration can take place in a short time, typically requiring less than a typical server maintenance window (e.g., 10 minutes). As a result, system downtime is minimized. In fact, in some embodiments no downtime is required: because the cloning procedure does not require that the source VM shut down, users can continue to use the source VM even as it is migrated to a destination VM.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a virtual machine migration system 100. In one embodiment, the virtual machine migration system 100 may comprise a computer-implemented system having a software migration application 110 comprising one or more components. Although the virtual machine migration system 100 shown in FIG. 1 has a limited number of elements in a certain topology, it may be appreciated that the virtual machine migration system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-$a$ may include components 122-1, 122-2, 122-3, 122-4 and 122-5. The embodiments are not limited in this context.

The virtual machine migration system 100 may comprise the migration application 110. The migration application 110 may be generally arranged to migrate guest OS 150 from source VM 140 running on source hypervisor 130 to destination VM 145 running on destination hypervisor 135, wherein each of migration application 110, source hypervisor 130, and destination hypervisor 135 all run on top of host OS 120.

File system 160 may store various files used in the operation of source VM 140 and destination VM 145, and thereby the operation of guest OS 140. File system 160 may store various files used by migration application 110. File system 160 may store various files used by the host OS 120. File system 160 may be provided by host OS 120 or may be a third-party file system working in conjunction by host OS 120. File system 160 may be a local file system, a network-accessible file system, a distributed file system, or use any other file system techniques for the storage of, maintenance of, and access to files.

File system 160 may store source VM configuration file 180 used by source hypervisor 130 for the determination of various configurations of source VM 140. File system 160 may store destination VM configuration file 185 used by destination hypervisor 130 for the determination of various configurations of source VM 140. Source VM configuration file 180 may be composed of one or more source VM configuration file blocks 195. Destination VM configuration file 185 may be composed of one or more destination VM configuration file blocks 197. The configuration of a virtual machine may comprise, among other elements, specifying the configuration of the hardware platform to be virtualized, such as number and type of CPU, memory size, disk size, etc.

Guest OS 150 may be presented a virtual disk by the virtual machines, the virtual disk an abstraction of the physical storage used by the virtual machines. File system 160 may store source VM virtual disk 170, where source VM virtual disk 170 is an arrangement of blocks corresponding to a virtual disk format used by the source hypervisor 130. File system 160 may store destination VM virtual disk 175, where destination VM virtual disk 175 is an arrangement of blocks corresponding to a virtual disk format used by the destination hypervisor 135. Virtual disk blocks 190 is the joint collection of blocks used by both source VM virtual disk 170 and destination VM virtual disk 175. Source VM virtual disk 170 and destination VM virtual disk 175 may be able to be built from almost entirely the same set of blocks, with the common blocks being those that correspond to the storage of data visible to the guest OS 150. Each of the source VM virtual disk 170 and destination VM virtual disk 175 may have one or more blocks dedicated to storage of data and metadata used by the source hypervisor 130 and destination hypervisor 135, respectively, that is not accessible to the guest OS 150. For example, block 191 may be exclusively used by source hypervisor 130 for storing data and metadata used for managing its access to the common blocks of virtual disk blocks 190. Similarly, block 192 may be exclusively used by destination hypervisor 135 for storing data and metadata used for managing its access to the common blocks of virtual disk blocks 190. It will be appreciated that multiple blocks may be used by either or both of source hypervisor 130 and destination hypervisor 135 for the storage of this data and metadata. Because of this overlap in storage blocks transitioning from source hypervisor 130 to destination hypervisor 135 may involve simply creating block 192, with its data and metadata for managing the common blocks, and constructing destination VM virtual disk 175 from those blocks used by source VM virtual disk 170 that are not exclusive to the management data and metadata of source hypervisor 130.

A data migration component or "agent" 155 may be installed in the guest OS 150 or may be a separate component in association with the guest OS 150 and also may be in communication with a host hypervisor 130 or 135. Alternatively or in addition, the data migration component 155 may be a separate entity run on a client device outside of the guest OS 150.

The data migration component 155 is controlled by a processor device and executes data migration tasks as described herein. The data migration component 155 may interact with the source hypervisor 130, the destination hypervisor 135, the guest OS 150, and the file system 160 to migrate data after detecting a change from the source hypervisor 130 to the destination hypervisor 135 or visa versa. In one embodiment, the data migration component 155 bypasses or eliminates the need for the migration application 110. When possible, the data migration component 155 is automatically pushed and installed into the guest OS 150 when the guest OS 150 credentials are known, otherwise the installation is performed by a user knowing the guest OS 150 credentials. Also, the in-guest utilities/tools may function as, and/or assist with, the data migration component 155 to eliminate and/or reduce the need for customized software.

The migration application 110 may interact with the source hypervisor 130, the destination hypervisor 135, the guest OS 150, and the file system 160 to migrate the guest OS 150 from the source hypervisor 130 to the destination hypervisor 135. The migration application 110 may generate one or more scripts that run in the guest OS 150 running on top of each of the source VM 140 and the destination VM 145 to perform the migration. The migration application 110 may use one or more scripts that run in the guest OS 150 on top of the source VM 140 to gather configuration information for use in generation of one or more scripts that run in the guest OS 150 on top of destination VM 145. The migration application 110 may send commands to and monitor the source hypervisor 130 and destination hypervisor 135. For instance, the migration application 110 may script or use direct commands to initiate power cycles of the virtual machines and use the power cycling of virtual machines to monitor the progress of scripts. By using scripts that use the built-in scripting of the guest OS 150 the migration application 110 may avoid installing software agents within the guest OS 150 for performing the migration, thereby simplifying the migration process.

Figure 2:
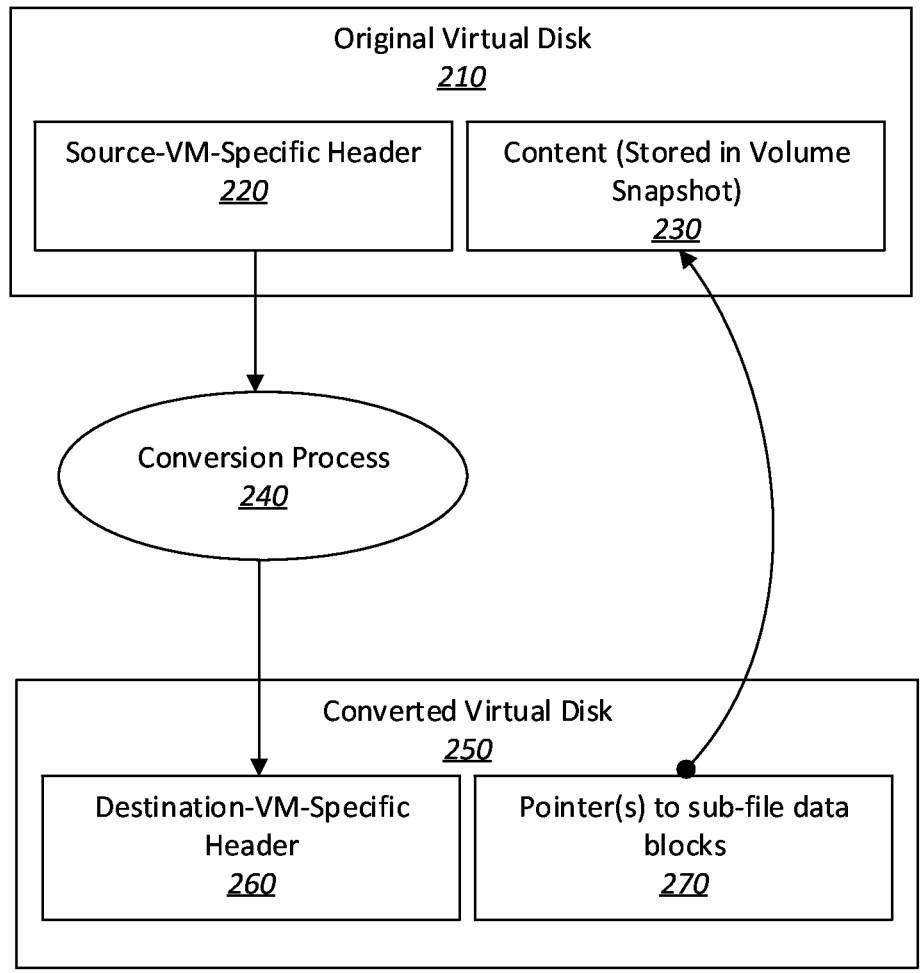
FIG. 2 schematically depicts a technique for converting virtual machine data from a format compatible with a first virtual machine to a format compatible with a second virtual machine.

FIG. 2 depicts a schematic overview of an exemplary technique performed by the data migration component 155 and/or the migration application 110 for migrating data from a source virtual machine to a destination virtual machine.

Original virtual disk 210 includes a source-VM-specific header 220 and content 230. The source-VM-specific header may include some information that is specific to the way that the source VM formats and/or stores the original data 210, and may include some information that is generic to the original data 210. The content 230 includes information stored on a volume associated with the source VM, where the volume employs volume snapshotting (described in more detail with respect to FIG. 3). The content 230 of the original virtual disk 210 is referenced through the volume snapshot.

In order to change the original virtual disk 210 into a converted virtual disk 250, some or all of the information in the source-VM-specific header 220 must be converted into a format that is compatible with the destination VM. Accordingly, a conversion process 240 is carried out on the source-VM-specific data. The conversion process 240 takes the information in the source-VM-specific header that is particular to the source VM and replaces it with equivalent data that is particular to the destination VM. A new destination-VM-specific header is created using the new header information. The conversion process 240 will vary depending on the identity of the source VM and the destination VM. Accordingly, the data migration component 255 and/or the migration application 110 may be programmed with logic for converting between different source/destination combinations. Upon receiving a request to migrate the original data 210 from a specified source VM to a specified destination VM, the data migration component 255 and/or the migration application 110 may retrieve the appropriate logic corresponding to the source destination pair, and apply the logic in the conversion process 240 to create a destination-VM-specific header.

In place of the content 230 of the original data, the converted data 250 includes one or more pointers 270 to the location in the volume snapshot at which the content 230 is stored. The data cloning process may make use of sub-file cloning, meaning that one or more pointers to portions of the virtual disk may be used. This allows the data to be cloned in constant time. Thus, in exemplary embodiments, the converted virtual disk 250 does not include a copy of the content 230.

Figure 3:
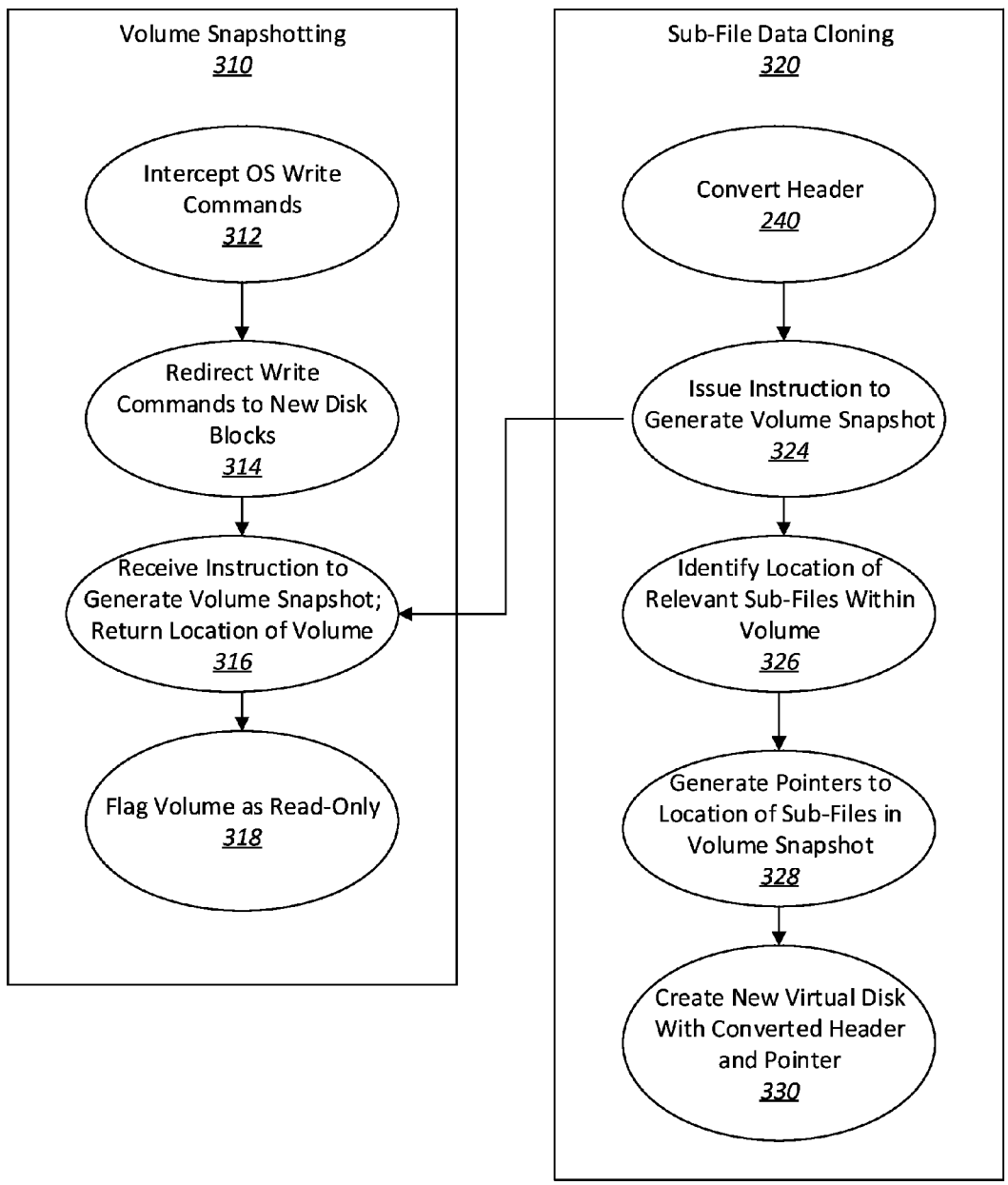
FIG. 3 is a flow diagram depicting an exemplary procedure suitable for use with embodiments described herein.

FIG. 3 is a flow chart representative of exemplary methodologies for performing aspects of the disclosed architecture. For simplicity of explanation, the methodologies are shown and described as a series of acts. Nonetheless, it is to be appreciated that the methodologies are not limited by the order of acts, as some acts may occur in a different order and/or concurrently with other acts. For example, those skilled in the art will understand that a methodology could alternatively be represented as a series of interrelated states or events, such as in a state diagram. Moreover, not all acts illustrated in a methodology may be required for a novel implementation.

As shown in FIG. 3, a volume snapshotting process 310 may occur in real-time as data (e.g., files or other data objects) are created or edited on a volume. A volume may be a defined area on a disk that is logically separated from other volumes on the disk, such as a partition or a designated storage area. For example, a disk (e.g., a hard disk) may contain a single volume organized into multiple partitions or drives (e.g., a "C:\" drive, a "D:\" drive, etc.). One or more files, also referred to as virtual disks, may be stored on the drives. Therefore, a volume may have multiple partitions, and each partition may have multiple virtual disks.

In some embodiments, the data referred to herein may be stored in an ONTAP volume from NetApp, Inc., of Sunnyvale, Calif. ONTAP volumes include built-in functionality for performing snapshotting, and hence may be particularly well-suited for use in exemplary embodiments.

At step 312, a "write" command may be intercepted from an operating system, such as the guest operating system resident on a source VM. An OS write command is a command to write certain data to a disk block in the volume. Conventionally, an OS write command would cause the old data in the disk block to be changed or overwritten.

However, at step 314, the intercepted write command is redirected to a new disk block, which stores changes to the data that the OS had originally designated for the original disk block.

Accordingly, the original disk block continues to store the original version of the data, while the new disk block stores the updated copy of the data. The original disk block therefore represents a read-only "snapshot" of the data at the time before the write command was issued, while the new disk block contains edited portions of the data that can be combined with the original disk block to create a current (up-to-date) version of the data.

As more write commands are intercepted and redirected at steps 312 and 314, different subsets of the disk blocks in the volume represent snapshots of the volume at different times. Accordingly, the system may maintain meta-data relating to the volume. The meta-data may identify which disk blocks contain data relating to particular snapshots on the volume. When a volume snapshot is requested for a particular time, the meta-data may be consulted to determine which disk blocks represent the correct volume snapshot.

The active file system may be represented as an index mapping file identifiers (or virtual disk identifiers) to pointers pointing to the disk blocks at which the relevant content of the corresponding files are stored. In the above example, the active file system's index may point to the original disk block for any part of the data that has not been updated, and the new disk block for the updated portions of the data.

The volume snapshot may be represented as a similar index of file identifiers and pointers, with the exception that the volume snapshot contains a list of pointers that represent the version of the data that existed at the time the volume snapshot was created. In volume snapshotting, the original disks are typically not edited, but rather stored in their original form. The volume snapshot therefore represents a read-only version of the volume at the time the snapshot was created.

Each of the disk blocks (e.g., the original disk block and the updated disk block) may represent portions of a virtual disk, or a sub-file. Pointers can be generated to relevant sub-files to store only a specified version of the file as it was represented at a particular point in time.

In addition to snapshotting an entire volume, it is also possible to maintain snapshots of individual files (e.g., the original disk block noted above). However, for purposes of the exemplary embodiments described herein, it may be more beneficial to maintain read-only snapshots of the entire volume. A snapshot of an individual file is essentially a read-only copy of the file; however, there is typically nothing preventing the snapshot of the file from being moved within the volume. As will be appreciated, if a pointer is created to a snapshot of a file, it is possible that the file will be moved and the pointer will point to different data than was originally intended. This may cause corruption and system crashes when the system attempts to access the data.

On the other hand, when a snapshot is created of an entire volume, the individual disk blocks (e.g., files) within the volume do not move. Therefore, the volume snapshot always contains an accurate read-only copy of the data in the volume's disk blocks, and the data is static with respect to the location at which the data is stored. A pointer pointing to a volume snapshot is therefore more likely to point to the intended data.

Returning to FIG. 3, at step 316 the system may be instructed to generate a volume snapshot. Because the OS write commands have been intercepted and redirected in real-time as the disk blocks of the volume were being edited, the volume snapshot already exists. All that is required is for the appropriate disk blocks corresponding to the volume snapshot at the time the request was received to be identified. Accordingly, the system may consult the above-described volume metadata, and may return (in response to the request) an identification of the location of the disk blocks representing the volume snapshot. Regardless of the size of the data in the volume snapshot, this procedure can be carried out in constant time because no data needs to be copied. Instead (for example), only a simple lookup of the requested time is carried out in the meta-data, and a corresponding list of disk blocks is returned.

At step 318, the disk blocks that were the subject of the volume snapshot may be flagged as read-only. If the volume performs volume snapshotting as a matter of course, and therefore does not allow the original disk blocks to be overwritten, step 318 may be omitted as unnecessary.

In order to migrate the data, the volume snapshotting process 310 may be carried out in conjunction with a sub-file data cloning process 320. When a request to migrate virtual disks from one virtual machine to another is received, the data migration component 155 and/or the migration application 110 may call the data cloning process 320 to migrate the virtual disks associated with the source virtual machine to the destination virtual machine.

The data cloning process 320 begins by taking a snapshot of the hypervisor managing the source VM. The snapshot of the hypervisor of the source VM provides a backup copy of the original VM information, in case an error occurs in the migration process and the system needs to be reverted back to the source VM.

The virtual disks to be migrated from the source virtual machine are also retrieved. Each virtual disks of the source virtual machine includes a header and content. The header is converted from a source-VM-compatible header to a destination-VM-compatible header using a process 240 such as the one described above in connection with FIG. 2.

With regard to the content of the virtual disks, the system may issue an instruction to generate a volume snapshot at step 324. The volume snapshotting process 310 may consult the above-described metadata to identify the location of the disk blocks representing the volume snapshot, and may return the location of the relevant disk blocks to the data cloning process 320.

The volume snapshot includes all of the data in the volume, of which the virtual disks currently being converted may be only one part. Accordingly, the location of the virtual disks' content within the volume snapshot may be identified at step 326. As noted above, one virtual disk may include multiple disk blocks' worth of data, depending on how the data was edited. The location of the content may be identified based on the address of the content within the original volume that was snapshotted (e.g., using the above-described volume index). The address may be used to generate pointers to the sub-file disk blocks containing the content, at step 328.

At step 330, a new data object (e.g., a new virtual disk) may be created for the destination virtual machine. The new data object may include the converted header created at step 240 and, in place of the content of the original virtual disk, the pointer(s) created at step 328.

Figure 4:
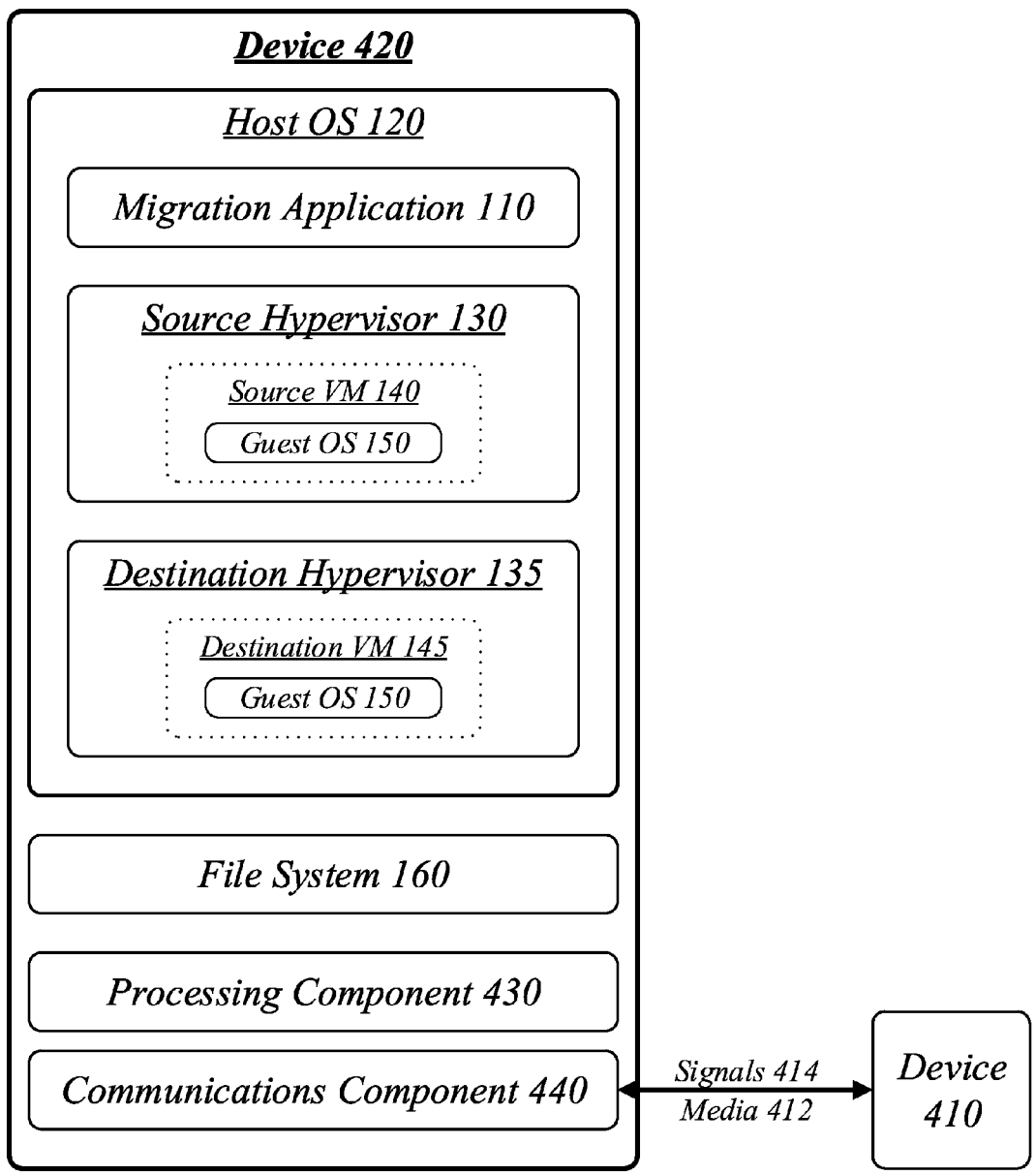
FIG. 4 illustrates an embodiment of a centralized system for the virtual machine migration system of FIG. 1.

FIG. 4 illustrates a block diagram of a centralized system 400 that may implement some or all of the structure and/or operations for the virtual machine migration system 100 in a single computing entity, such as entirely within a single device 420.

The device 420 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 420 may execute processing operations or logic for the system 100 using a processing component 430. The processing component 430 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 420 may execute communications operations or logic for the system 100 using communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1240 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 412 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 420 may communicate with a device 410 over a communications media 412 using communications signals 414 via the communications component 440. The device 410 may be internal or external to the device 420 as desired for a given implementation.

The device 420 may host the host OS 120, the host 120 running the migration application 110, source hypervisor 130, and destination hypervisor 135, with the source VM 140 and destination VM 145 provided by the respective hypervisors 130, 135. The device 420 may also host the file system 160 storing the virtual disk blocks 190 for the source VM virtual disk 170 and destination VM virtual disk 175. The migration application 110 may perform the migration of the guest OS 150 from the source VM 140 to the destination VM 145 on the device 420.

The device 410 may provide support or control for the migration operations of the migration application 110 and/or the hosting operations of the device 420 and host 120. The device 410 may comprise an external device externally controlling the device 420, such as where device 410 is a server device hosting the guest OS 150 and the device 410 is a client administrator device used to administrate device 410 and initiate the migration using migration application 110. In some of these cases, the migration application 110 may instead be hosted on the device 410 with the remainder of the virtual machine migration system 100 hosted on the device 420. Alternatively, the device 410 may have hosted the migration application 110 as a distribution repository, with the migration application 110 downloaded to the device 420 from the device 410.

Figure 5:
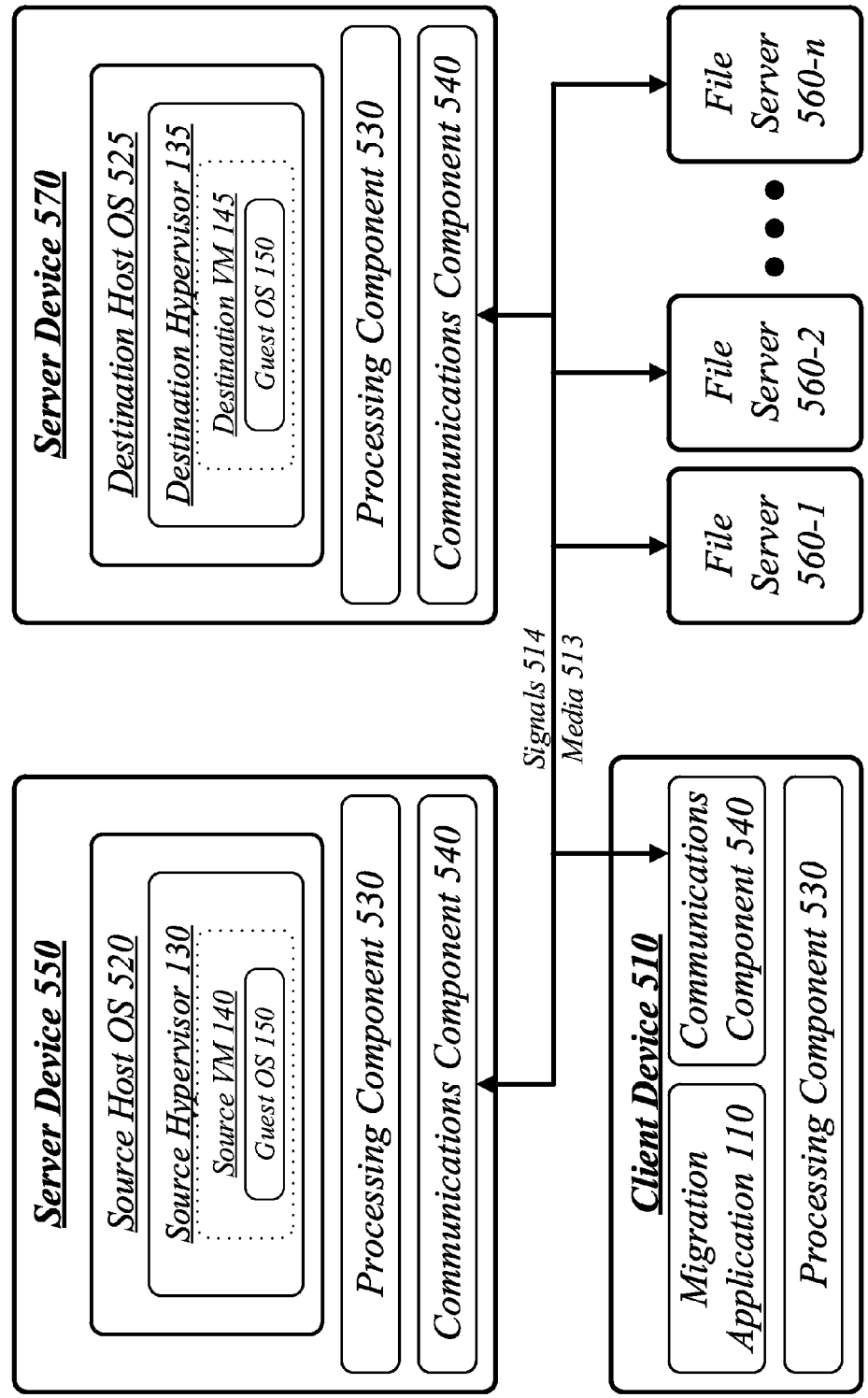
FIG. 5 illustrates an embodiment of a distributed system for the virtual machine migration system of FIG. 1.

FIG. 5 illustrates a block diagram of a distributed system 500. The distributed system 500 may distribute portions of the structure and/or operations for the virtual machine migration system 100 across multiple computing entities. Examples of distributed system 500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 500 may comprise a client device 510 and server devices 550 and 570. In general, the client device 510 and the server devices 550 and 570 may be the same or similar to the client device 420 as described with reference to FIG. 4. For instance, the client device 510 and the server devices 550 and 570 may each comprise a processing component 530 and a communications component 540 which are the same or similar to the processing component 430 and the communications component 440, respectively. In another example, the devices 510, 550, and 570 may communicate over a communications media 512 using communications signals 514 via the communications components 540. The distributed system 500 may comprise a distributed file system implemented by distributed file servers 560 including file servers 560-1 through 560-n, where the value of n may vary in different embodiments and implementations. The local storage of the client device 510 and server devices 550, 570 may work in conjunction with the file servers 560 in the operation of the distributed file system, such as by providing a local cache for the distributed file system primarily hosted on the file servers 560 so as to reduce latency and network bandwidth usage for the client device 510 and server devices 550, 570.

The client device 510 may comprise or employ one or more client programs that operate to perform various methodologies in accordance with the described embodiments. In one embodiment, for example, the client device 510 may implement the migration application 110 initiating, managing, and monitoring the migration of the guest OS 150 from the source VM 140 to the destination VM 145. The client device 1310 may use signals 1314 to interact with the source hypervisor 130, destination hypervisor 135 and/or guest OS 150 while they are running on each of the source VM 140 and destination VM 145, and file servers 1360.

The server devices 550, 570 may comprise or employ one or more server programs that operate to perform various methodologies in accordance with the described embodiments. In one embodiment, for example, the server device 550 may implement a source host OS 520 hosting the source hypervisor 130 providing the source VM 140. The server device 550 may use signals 514 to receive control signals from the migration application 110 on client device 510 and to transmit configuration and status information to the migration application 110. The server device 550 may use signals 514 communicate with the file servers 560 both for the providing of source VM 140 and for the migration of guest OS 150 from the source VM 140 to the destination VM 145.

The server device 570 may implement a destination host OS 525 hosting the destination hypervisor 135 providing the destination VM 145. The server device 570 may use signals 514 to receive control signals from the migration application 110 on client device 510 and to transmit configuration and status information to the migration application 110. The server device 570 may use signals 514 communicate with the file servers 560 both for the providing of destination VM 145 and for the migration of guest OS 150 to the destination VM 145 to the source VM 140.

In some embodiments, the same server device may implement both the source hypervisor 130 and the destination hypervisor 135. In these embodiments, the migration application 110 hosted on a client device 510 may perform the migration of the guest OS 150 from the source VM 140 to the destination VM 145 on this single server device, in conjunction with migration operations performed using the distributed file system.

Figure 6:
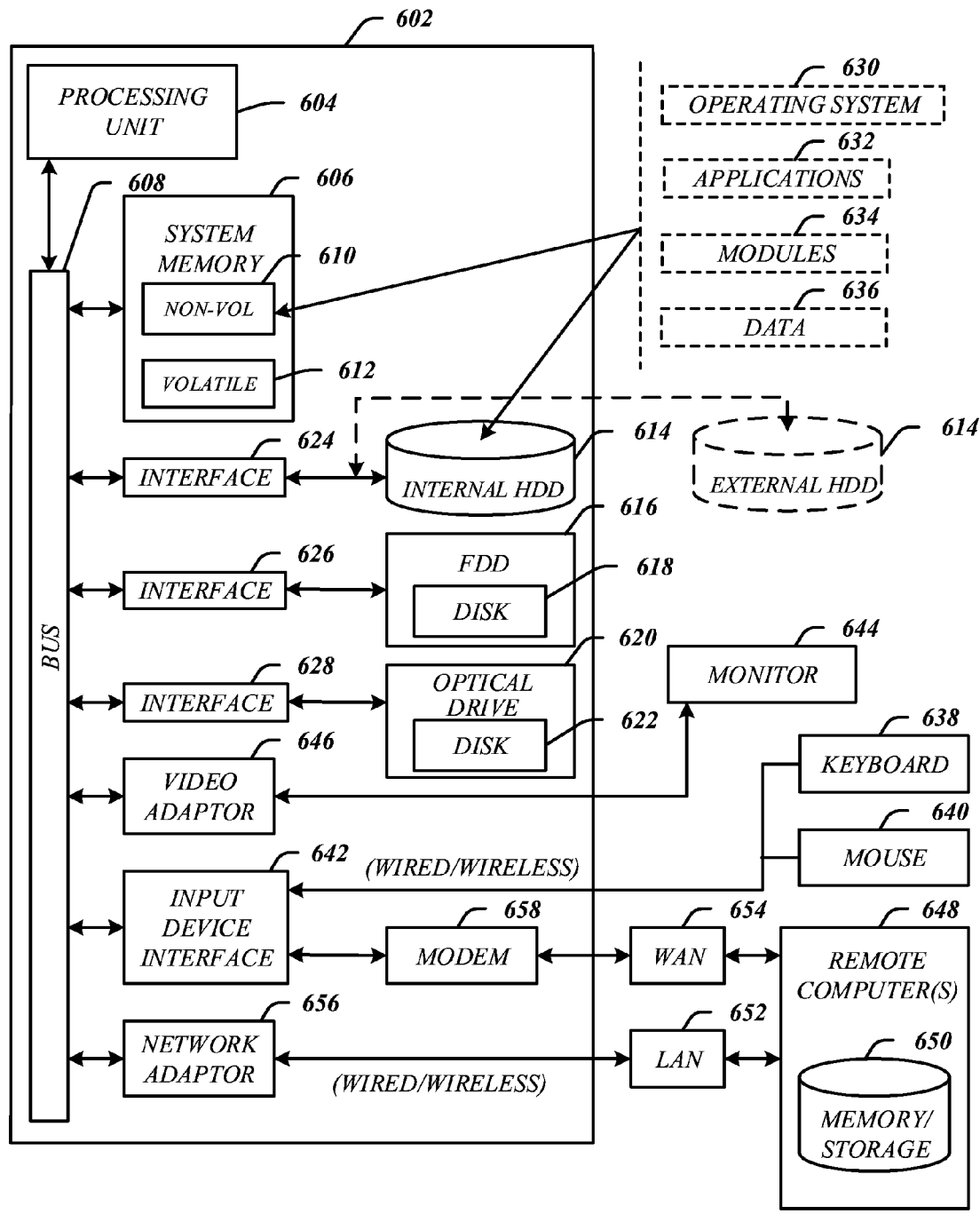
FIG. 6 illustrates an embodiment of a computing architecture.

FIG. 6 illustrates an embodiment of an exemplary computing architecture 600 suitable for implementing various embodiments as previously described. In one embodiment, the computing architecture 600 may comprise or be implemented as part of an electronic device. Examples of an electronic device may include those described with reference to FIG. 5, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1404 through an input device interface 642 that is coupled to the system bus 608, but can be connected by other interfaces such as a parallel port, IEEE 694 serial port, a game port, a USB port, an IR interface, and so forth.

A monitor 644 or other type of display device is also connected to the system bus 1408 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
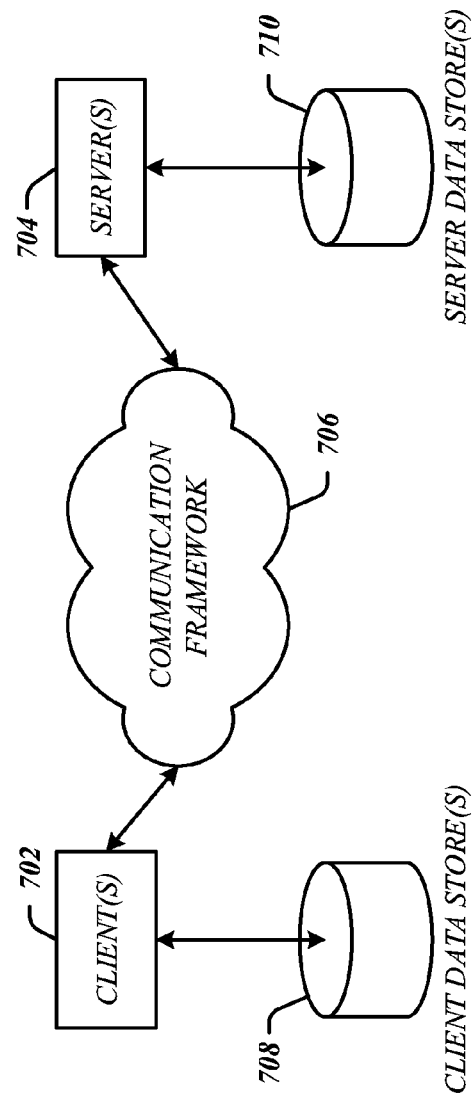
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. The clients 702 may implement the client device 510 shown in FIG. 5. The servers 704 may implement the server device 550 shown in FIG. 5. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   receiving a request to migrate a first virtual disk from a source virtual machine to a destination virtual machine, wherein the first virtual disk is stored on a volume accessible to the source virtual machine;
   generating a snapshot of a hypervisor managing the source virtual machine;
   identifying a header of the first virtual disk;
   modifying the header to be compatible with the destination virtual machine;
   identifying, on the volume accessible to the source virtual machine, a snapshot of the volume;
   generating a pointer to content of the first virtual disk within the snapshot of the volume; and
   creating a second virtual disk for the destination virtual machine without copying the content from the first virtual disk, wherein the second virtual disk comprises the modified header and the pointer to the content of the first virtual disk within the snapshot of the volume.

2. The method of claim 1, wherein modifying the header to be compatible with the destination virtual machine comprises:
   identifying a first virtual disk format utilized by a first hypervisor managing the source virtual machine and a second virtual disk format utilized by a second hypervisor managing the destination virtual machine; and
   reformatting the header from the first virtual disk format to the second virtual disk format.

3. The method of claim 1, wherein generating the snapshot of the hypervisor managing the source virtual machine comprises:
   identifying the source virtual machine and the hypervisor based, at least in part, on the request to migrate the first virtual disk; and
   generating the snapshot prior to migration of the first virtual disk to the destination virtual machine.

4. The method of claim 1, further comprising:
   determining a time associated with the request to migrate the first virtual disk;
   wherein identifying, on the volume accessible to the source virtual machine, the snapshot of the volume comprises identifying the snapshot of the volume based, at least in part, on the time.

5. The method of claim 1, further comprising flagging the snapshot of the volume as read-only prior to generating the pointer to the content of the first virtual disk within the snapshot.

6. The method of claim 1, wherein generating a pointer to content of the first virtual disk within a snapshot of the volume comprises:
   determining a location of the content as stored on the volume; and
   analyzing metadata of the snapshot to identify the content within the snapshot based, at least in part, on the location.

7. One or more non-transitory computer-readable media comprising program code for migrating virtual disks, the program code to:
   based on receipt of a request to migrate a first virtual disk from a source virtual machine to a destination virtual machine, wherein the first virtual disk is stored on a volume accessible to the source virtual machine,
   generate a snapshot of a hypervisor managing the source virtual machine;
   identify a header of the first virtual disk;
   modify the header to be compatible with the destination virtual machine;
   identify, on the volume accessible to the source virtual machine, a snapshot of the volume;
   generate a pointer to content of the first virtual disk within the snapshot of the volume; and
   create a second virtual disk for the destination virtual machine without copying the content from the first virtual disk, wherein the second virtual disk comprises the modified header and the pointer to the content of the first virtual disk within the snapshot of the volume.

8. The computer-readable media of claim 7, wherein the program code to modify the header to be compatible with the destination virtual machine comprises program code to:
   identify a first virtual disk format utilized by a first hypervisor managing the source virtual machine and a second virtual disk format utilized by a second hypervisor managing the destination virtual machine; and
   reformat the header from the first virtual disk format to the second virtual disk format.

9. The computer-readable media of claim 7, wherein the program code to generate the snapshot of the hypervisor managing the source virtual machine comprises program code to:
   identify the source virtual machine and the hypervisor based, at least in part, on the request to migrate the first virtual disk; and
   generate the snapshot prior to migration of the first virtual disk to the destination virtual machine.

10. The computer-readable media of claim 7, further comprising program code to:
    determine a time associated with the request to migrate the first virtual disk;
    wherein the program code to identify, on the volume accessible to the source virtual machine, the snapshot of the volume comprises program code to identify the snapshot of the volume based, at least in part, on the time.

11. The computer-readable media of claim 7, further comprising program code to flag the snapshot of the volume as read-only prior to generation of the pointer to the content of the first virtual disk within the snapshot.

12. A system comprising:
a processor; and
a machine-readable medium having program code executable by the processor to cause the system to,
based on receipt of a request to migrate a first virtual disk from a source virtual machine to a destination virtual machine, wherein the first virtual disk is stored on a volume accessible to the source virtual machine,
generate a snapshot of a hypervisor managing the source virtual machine;
identify a header of the first virtual disk;
modify the header to be compatible with the destination virtual machine;
identify, on the volume accessible to the source virtual machine, a snapshot of the volume;
generate a pointer to content of the first virtual disk within the snapshot of the volume; and
create a second virtual disk for the destination virtual machine without copying the content from the first virtual disk, wherein the second virtual disk comprises the modified header and the pointer to the content of the first virtual disk within the snapshot of the volume.

13. The system of claim 12, wherein the program code executable by the processor to cause the system to modify the header to be compatible with the destination virtual machine comprises program code executable by the processor to cause the system to:
identify a first virtual disk format utilized by a first hypervisor managing the source virtual machine and a second virtual disk format utilized by a second hypervisor managing the destination virtual machine; and
reformat the header from the first virtual disk format to the second virtual disk format.

14. The system of claim 12, wherein the program code executable by the processor to cause the system to generate the snapshot of the hypervisor managing the source virtual machine comprises program code executable by the processor to cause the system to:
identify the source virtual machine and the hypervisor based, at least in part, on the request to migrate the first virtual disk; and
generate the snapshot prior to migration of the first virtual disk to the destination virtual machine.

15. The system of claim 12, further comprising program code executable by the processor to cause the system to:
determine a time associated with the request to migrate the first virtual disk;
wherein the program code executable by the processor to cause the system to identify, on the volume accessible to the source virtual machine, the snapshot of the volume comprises program code executable by the processor to cause the system to identify the snapshot of the volume based, at least in part, on the time.

16. The system of claim 12, further comprising program code executable by the processor to cause the system to flag the snapshot of the volume as read-only prior to generation of the pointer to the content of the first virtual disk within the snapshot.

17. The system of claim 12, wherein the program code executable by the processor to cause the system to generate a pointer to content of the first virtual disk within a snapshot of the volume comprises program code executable by the processor to cause the system to:
determine a location of the content as stored on the volume; and
analyze metadata of the snapshot to identify the content within the snapshot based, at least in part, on the location.

* * * * *